(12) United States Patent
Tashiro

(10) Patent No.: US 11,338,683 B2
(45) Date of Patent: May 24, 2022

(54) ELECTRICALLY DRIVEN VEHICLE

(71) Applicant: TOYOTA JIDOSHA KABUSHIKI KAISHA, Toyota (JP)

(72) Inventor: Hiroki Tashiro, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 741 days.

(21) Appl. No.: 16/243,631

(22) Filed: Jan. 9, 2019

(65) Prior Publication Data
US 2019/0225086 A1 Jul. 25, 2019

(30) Foreign Application Priority Data

Jan. 19, 2018 (JP) .............................. JP2018-006844

(51) Int. Cl.
*B60L 3/00* (2019.01)
*B60L 58/26* (2019.01)
(Continued)

(52) U.S. Cl.
CPC ........... *B60L 3/0046* (2013.01); *B60L 3/0038* (2013.01); *B60L 58/26* (2019.02); *H01M 10/486* (2013.01);
(Continued)

(58) Field of Classification Search
CPC ....... B60W 2050/02; B60W 2050/021; B60W 2050/0215; B60W 2050/022; B60W 2050/0225; B60W 2050/029; G01R 27/00; G01R 27/02; G01R 27/12; G01R 27/14; G01R 27/26; G01R 17/00; G01R 17/02; G01R 19/00; G01R 19/0023; G01R 19/0038; G01R 19/165; G01R 19/16566; G01R 19/16576; G01R 19/30; G01R 19/32; B60L 58/26; B60L 3/0038;
(Continued)

(56) References Cited

U.S. PATENT DOCUMENTS

2010/0206039 A1* 8/2010 Kates ...................... G08B 29/26
73/1.01

FOREIGN PATENT DOCUMENTS

JP 7-140216 A 6/1995
JP 2005-331482 A 12/2005
(Continued)

*Primary Examiner* — Anthony R Jimenez
(74) *Attorney, Agent, or Firm* — Sughrue Mion, PLLC

(57) ABSTRACT

In the event of an abnormality occurring in a temperature sensor that is used to detect the temperature of a battery, an electrically driven vehicle sets a drivable time by using a reference temperature of the battery and gives permission for emergency drive until a driving time of the electrically driven vehicle reaches the drivable time. When the reference temperature is used for the first time since the occurrence of the abnormality in the temperature sensor, a temperature detected before the occurrence of the abnormality in the temperature sensor is used as the reference temperature. When the reference temperature is used for the second or subsequent time since the occurrence of the abnormality in the temperature sensor, a temperature obtained by applying a resistance value based on an inter-terminal voltage of the battery and an electric current flowing in the battery, to a correlation between battery resistance and battery temperature is used as the reference temperature.

7 Claims, 5 Drawing Sheets

(51) Int. Cl.
   *H01M 10/613* (2014.01)
   *H01M 10/625* (2014.01)
   *H01M 10/48* (2006.01)
   *H01M 10/6561* (2014.01)
(52) U.S. Cl.
   CPC ....... *H01M 10/613* (2015.04); *H01M 10/625* (2015.04); *H01M 10/6561* (2015.04); *B60L 2240/545* (2013.01); *B60L 2260/44* (2013.01); *B60Y 2200/91* (2013.01); *B60Y 2306/05* (2013.01); *H01M 2220/20* (2013.01)
(58) Field of Classification Search
   CPC ........... B60L 2240/545; B60L 2260/44; B60L 3/0046; B60L 3/00; H01M 10/486; H01M 10/613; H01M 10/625; H01M 10/6561; H01M 10/48
   USPC .......................................................... 701/22
   See application file for complete search history.

(56) References Cited

FOREIGN PATENT DOCUMENTS

| | | | |
|---|---|---|---|
| JP | 2008256673 | A | 10/2008 |
| JP | 2011-222133 | A | 11/2011 |
| JP | 2014-017901 | A | 1/2014 |
| JP | 2014-094670 | A | 5/2014 |
| JP | 2014-232649 | A | 12/2014 |
| JP | 2017-17962 | A | 1/2017 |
| JP | 2017-169319 | A | 9/2017 |

\* cited by examiner

ELECTRICALLY DRIVEN VEHICLE

CROSS-REFERENCE TO RELATED APPLICATION

This application claims priority to Japanese Patent Application No. 2018-006844 filed on Jan. 19, 2018, the contents of which is incorporated herein by reference.

TECHNICAL FIELD

The present disclosure relates to an electrically driven vehicle.

BACKGROUND

In the event of an abnormality occurring in a control microcomputer configured to control an assembled battery that is used to supply electric power to an electric motor for driving, a proposed configuration of an electrically driven vehicle causes a monitor microcomputer to determine a drivable time, based on a remaining capacity of the assembled battery and continues the supply of electric power from the assembled battery to the electric motor for driving until elapse of the drivable time (as described in, for example, JP 2014-17901A). When the temperature of the assembled battery becomes out of an appropriate range prior to elapse of the drivable time, the electrically driven vehicle of this configuration stops the supply of electric power from the assembled battery to the electric motor for driving at the moment and thereby assures protection and the safety of the assembled battery.

CITATION LIST

Patent Literature

PTL 1: JP2014-17901A

SUMMARY

In the event of an abnormality occurring in a temperature sensor of the assembled battery, however, the electrically driven vehicle of the above configuration fails to determine whether the temperature of the assembled battery is in the appropriate range or not and thereby fails to determine whether the supply of electric power is to be continued from the assembled battery to the electric motor for driving. Discontinuance of the supply of electric power from the assembled battery to the electric motor for driving fails to perform emergency drive. Continuance of the supply of electric power from the assembled battery to the electric motor for driving is, however, likely to damage the assembled battery when the temperature of the assembled battery is out of the appropriate range.

A main object of an electrically driven vehicle of the present disclosure is to perform an emergency drive more appropriately, while suppressing damage of a battery, even in the event of an abnormality occurring in a temperature sensor that is used to detect the temperature of the battery.

The electrically driven vehicle of the present disclosure employs the following aspects, in order to achieve the main object described above.

The present disclosure directed to an electrically driven vehicle. The electrically driven vehicle includes a battery, a temperature sensor configured to detect temperature of the battery, a motor configured to output a power for driving by using electric power from the battery, and a control device configured to set a drivable time using a reference temperature of the battery and to give permission for emergency drive until a driving time reaches the drivable time, when an abnormality occurs in the temperature sensor. The control device is configured:

(1) when the reference temperature is used for a first time since the occurrence of the abnormality in the temperature sensor, to use a temperature detected before the occurrence of the abnormality in the temperature sensor, as the reference temperature; and (2) when the reference temperature is used for a second or subsequent time since the occurrence of the abnormality in the temperature sensor, to use a temperature obtained by applying a resistance value based on an inter-terminal voltage of the battery and an electric current flowing in the battery, to a correlation between battery resistance and battery temperature, as the reference temperature.

The electrically driven vehicle of this aspect includes the battery, the temperature sensor configured to detect the temperature of the battery, and the motor configured to output the power for driving by using the electric power from the battery. In the event of an abnormality occurring in the temperature sensor, the electrically driven vehicle sets the drivable time by using the reference temperature of the battery and gives permission for emergency drive until the driving time reaches the drivable time. The drivable time is experimentally or otherwise determined in advance, as a time period that is equal to or less than an upper limit time, in which the temperature of the battery is within an appropriately range even in the case of continuation of driving from the time when the temperature of the battery is equal to the reference temperature. The configuration of giving permission for emergency drive until the driving time reaches the drivable time that is set by using the reference temperature of the battery assures the emergency drive, while suppressing damage of the battery. When the reference temperature is used for the first time since the occurrence of the abnormality in the temperature sensor, the temperature detected before the occurrence of the abnormality in the temperature sensor is used as the reference temperature. The temperature detected by the temperature sensor in the normal state is used as the reference temperature. This enables the drivable time to be set more appropriately. When the reference temperature is used for the second or subsequent time since the occurrence of the abnormality in the temperature sensor, the temperature obtained by applying the resistance value based on the inter-terminal voltage of the battery and the electric current flowing in the battery, to the correlation between the battery resistance and the battery temperature is used as the reference temperature. The battery resistance varies with the temperature of the battery. The configuration of applying the resistance value based on the inter-terminal voltage of the battery and the electric current flowing in the battery to the correlation between the battery resistance and the battery temperature enables the more appropriate temperature to be used as the reference temperature. As a result, this configuration performs the emergency drive more appropriately, while suppressing damage of the battery, even in the event of an abnormality occurring in the temperature sensor that is used to detect the temperature of the battery. The time "when the reference temperature is used for the second or subsequent time since the occurrence of the abnormality in the temperature sensor" may be, for example, when a predetermined time period, such as 3 minutes, 5 minutes or 10 minutes, has elapsed since the previous use of the reference temperature or when the electrically driven vehicle restarts the system after performing the emergency drive in the event of an abnormality occurring in the temperature sensor and performing the system stop.

DESCRIPTION OF EMBODIMENTS

The following describes some aspects of the present disclosure with reference to embodiments.

Figure 1:
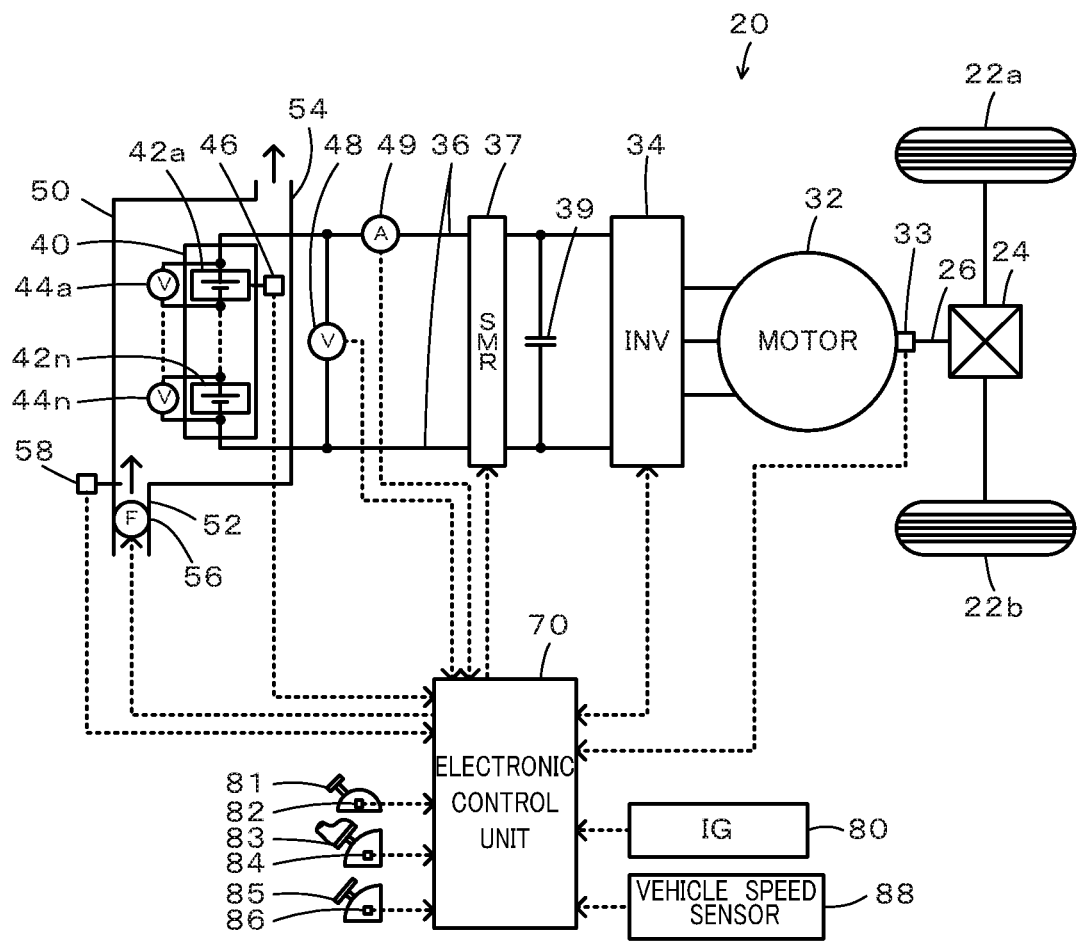
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 40, a system main relay 37, a cooling device 50 configured to cool down the battery 40, and an electronic control unit 70.

The motor 32 is configured as a synchronous motor generator having a rotor with permanent magnets embedded therein and a stator with three-phase coils wound thereon. The rotor of the motor 32 is connected with a driveshaft 26 that is coupled with drive wheels 22a and 22b via a differential gear 24. The inverter 34 is used to drive the motor 32 and is connected with the battery 40 via power lines 36. The electronic control unit 70 performs switching control of a plurality of switching elements (not shown) included in the inverter 34, so as to rotate and drive the motor 32.

The battery 40 is configured by connecting a plurality of cells 42a to 42n in series, as a secondary battery, for example, a lithium ion rechargeable battery, and is connected with the inverter 34 via the power lines 36 as described above. A capacitor 39 for smoothing is mounted on the power lines 36.

The system main relay 37 is located on the battery 40-side of the inverter 34 and the capacitor 39 on the power lines 36 and is controlled on and off by the electronic control unit 70 to connect and disconnect the battery 40 with and from the inverter 34 and the capacitor 39.

The cooling device 50 is configured as a housing to place the battery 40 therein and includes an air inlet 52 and an air outlet 54. A fan 56 is mounted to the air inlet 52 and is driven to take the outside air into the air inlet 52. The outside air taken into the air inlet 52 is used to cool down the battery 40 and is discharged from the air outlet 54.

The electronic control unit 70 is configured as a CPU-based microprocessor and includes a ROM configured to store processing programs, a RAM configured to temporarily store data, a flash memory and input/output ports, in addition to the CPU. Signals from various sensors are input into the electronic control unit 70 via the input port. The signals input into the electronic control unit 70 include, for example, a rotational position θm from a rotational position detection sensor (for example, a resolver) 33 configured to detect the rotational position of the rotor of the motor 32 and phase currents Iu and Iv from current sensors (not shown) configured to detect the phase currents of the respective phases of the motor 32. The input signals also include a battery voltage Vb from a voltage sensor 48 placed between terminals of the battery 40 and a battery current Ib from a current sensor 49 mounted to an output terminal of the battery 40. The input signals further include cell voltages Va to Vn from cell voltage sensors 44a to 44n mounted to the respective cells of the battery 40, a battery temperature Tb from a temperature sensor 46 mounted to the battery 40, and an intake air temperature Ta from a temperature sensor 58 placed at the air inlet 52 of the cooling device 50. The input signals also include an ignition signal from an ignition switch 80 and a shift position SP from a shift position sensor 82 configured to detect an operating position of a shift lever 81. The input signals further include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. A variety of control signals are output from the electronic control unit 70 via the output port. The signals output from the electronic control unit 70 include, for example, switching control signals to the plurality of switching elements included in the inverter 34, an on-off control signal to the system main relay 37 and a driving signal to the fan 56 of the cooling device 50. The electronic control unit 70 calculates an electrician angle θe and a rotation speed Nm of the motor 32, based on the rotational position θm of the rotor of the motor 32 from the rotational position detection sensor 33. The electronic control unit 70 also calculates a state of charge SOC of the battery 40, based on the battery current Ib from the current sensor 49. The state of charge SOC denotes a ratio of the amount of electric power dischargeable from the battery 40 at the moment to the overall amount of electric power at the full charge level of the battery 40.

In the electric vehicle 20 of the embodiment having the configuration described above, the electronic control unit 70 sets a required torque Td* that is required for the driveshaft 26, based on the accelerator position Acc and the vehicle speed V. The electronic control unit 70 limits the required torque Td* with an upper limit torque Tmax of the motor 32 (upper limit guarding) and sets the limited required torque Td* to a torque command Tm* of the motor 32. The electronic control unit 70 then performs switching control of the plurality of switching elements of the inverter 34, such as to drive the motor 32 with the torque command Tm*.

Figure 2:
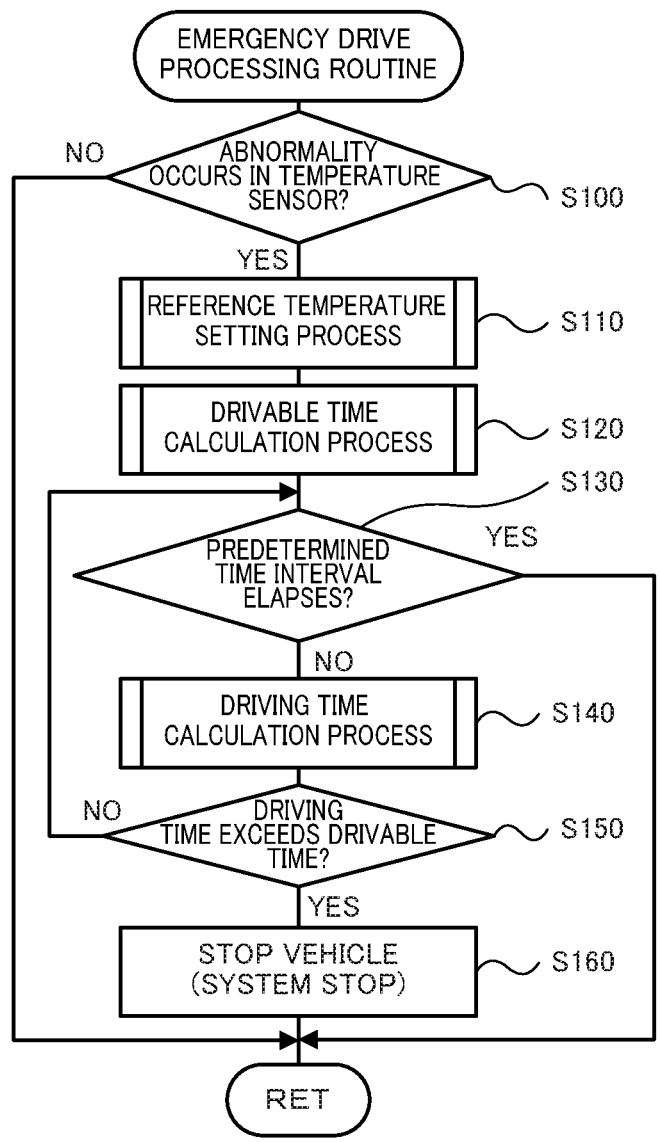
FIG. 2 is a flowchart showing one example of an emergency drive processing routine performed by an electronic control unit.

The following describes the operations of the electric vehicle 20 of the embodiment or more specifically a series of operations in the event of an abnormality occuring in the temperature sensor 46 that is used to detect the temperature of the battery 40. FIG. 2 is a flowchart showing one example of an emergency drive processing routine performed by the electronic control unit 70 in the event of an abnormality occurring in the temperature sensor 46 that is used to detect the temperature of the battery 40. This routine is repeatedly performed at predetermined time intervals (for example, at every 3 minutes, at every 5 minutes or at every 10 minutes).

When the emergency drive processing routine is triggered, the electronic control unit 70 first determines whether there is any abnormality occurring in the temperature sensor 46 that is used to detect the temperature of the battery 40 (step S100). When it is determined that there is no abnormality occurring in the temperature sensor 46, there is no need for the emergency drive. The electronic control unit 70 accordingly terminates this routine.

Figure 3:
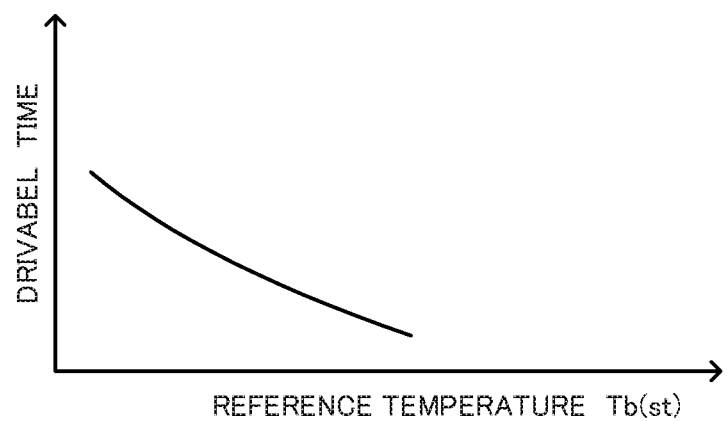
FIG. 3 is a diagram illustrating one example of a drivable time setting map.

When it is determined at step S100 that there is any abnormality occurring in the temperature sensor 46, on the other hand, the electronic control unit 70 performs a process of setting a reference temperature Tb(st) of the battery 40 (reference temperature setting process) (step S110) and subsequently performs a process of calculating a drivable time based on the set reference temperature Tb(st) (drivable time calculation process) (step S120). The reference temperature Tb(st) of the battery 40 denotes a temperature used to set a time period in which emergency drive is allowed, and is equal to the temperature of the battery 40 at that time or is equal to the temperature detected by the temperature sensor 46 if there is no abnormality occurring in the temperature sensor 46. In this case, however, there is an abnormality occurring in the temperature sensor 46. The reference temperature setting process is accordingly performed to estimate the temperature of the battery 40 at that time and set the estimated temperature as the reference temperature. The reference temperature setting process will be described in detail later. The drivable time used may be a time period required to cause the temperature of the battery 40 to reach a predetermined temperature that is equal to or lower than an upper limit temperature of an appropriate temperature range of the battery 40 when driving continues from the reference temperature Tb(st) of the battery 40. A procedure of setting the drivable time according to the embodiment may determine in advance a relationship between the reference temperature Tb(st) and the drivable time experimentally or otherwise, store the relationship in the form of a drivable time setting map, and read a drivable time corresponding to a given reference temperature Tb(st) from the map. FIG. 3 illustrates one example of the drivable time setting map. As illustrated, the drivable time is set to provide a larger value at the lower reference temperature Tb(st) and a smaller value at the higher reference temperature Tb(st).

After setting the drivable time, the electronic control unit 70 repeatedly performs a process of calculating a driving time (driving time calculation process) and performs a process of determining whether the calculated driving time exceeds the drivable time, until elapse of the predetermined time interval at which the emergency drive processing routine is repeated (steps S130 to S150). When the predetermined time interval elapses before the driving time exceeds the drivable time, the electronic control unit 70 terminates this routine and performs again the emergency drive processing routine. When the driving time exceeds the drivable time before the predetermined time interval elapses, on the other hand, the electronic control unit 70 stops the vehicle (performs system stop) to stop the emergency drive (step S160) and terminates this routine. The system stop turns off the system main relay 37 and performs a predetermined system stop process.

As described above, in the event of an abnormality occurring in the temperature sensor 46 that is used to detect the temperature of the battery 40, the electronic control unit 70 sets the reference temperature Tb(st) of the battery 40 and sets the drivable time, based on the reference temperature Tb(st). The electronic control unit 70 gives permission for the emergency drive until the driving time reaches the drivable time, and performs the system stop (stops the vehicle) when the driving time reaches the drivable time.

Even in the event of an abnormality occurring in the temperature sensor 46 that is used to detect the temperature of the battery 40, this configuration assures the emergency drive, while suppressing damage of the battery 40. Furthermore, the reference temperature Tb(st) is set and the drivable time is calculated at every predetermined time interval. This configuration well responds to the varying temperature of the battery 40 with time.

Figure 4:
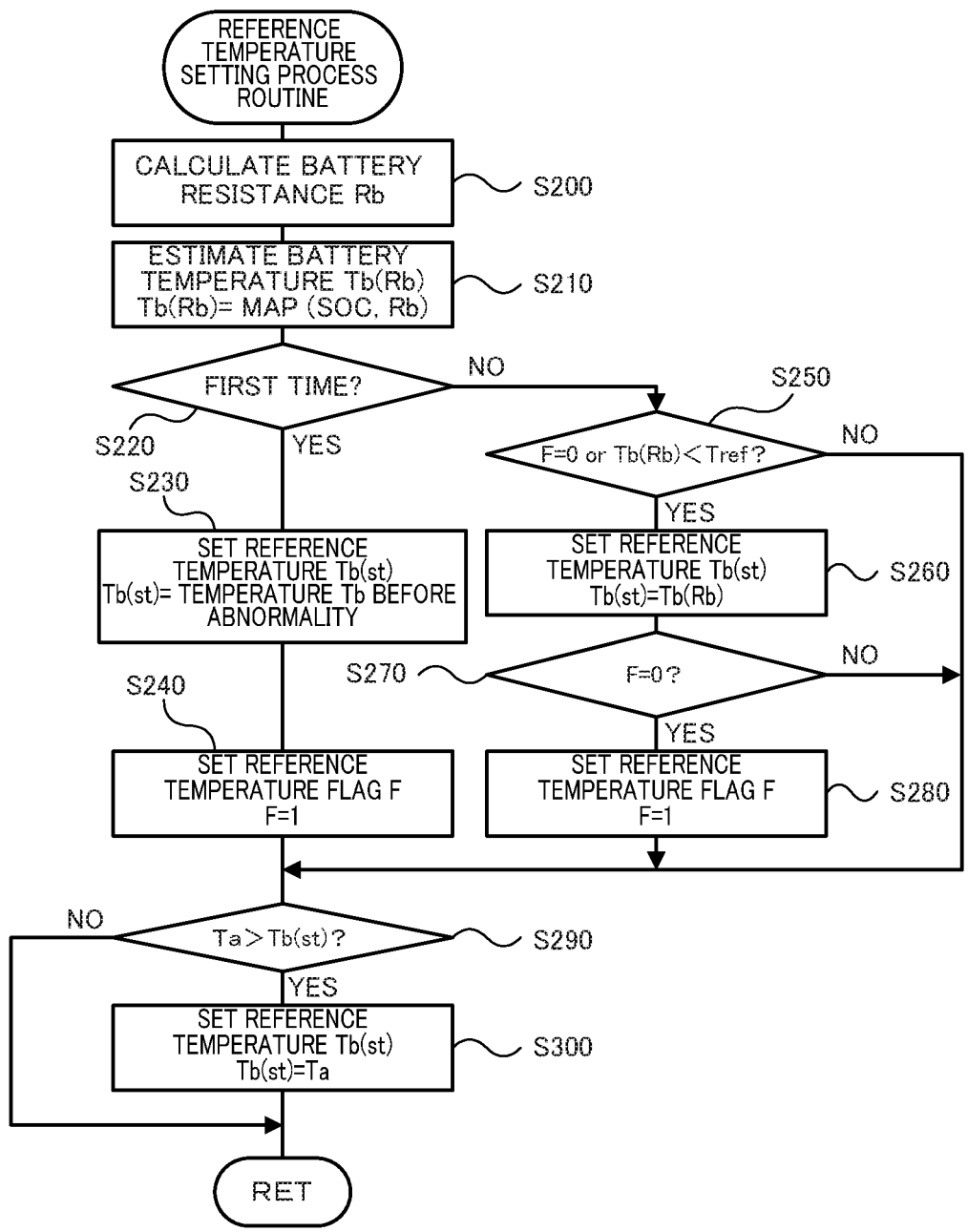
FIG. 4 is a flowchart showing one example of a reference temperature setting process routine performed by the electronic control unit.
Figure 5:
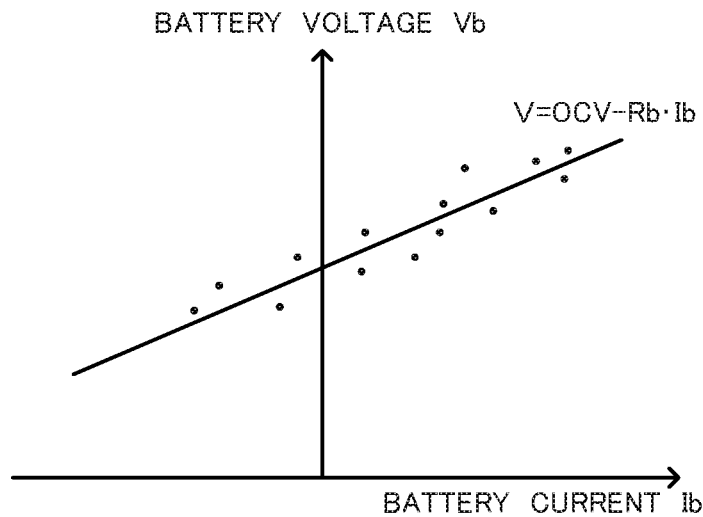
FIG. 5 is a diagram illustrating one example of a process of obtaining a battery resistance Rb from a battery temperature Vb and a battery current Ib.

The following describes the reference temperature setting process. FIG. 4 is a flowchart showing one example of a reference temperature setting process routine performed by the electronic control unit 70. When the reference temperature setting process routine is triggered, the electronic control unit 70 first calculates a battery resistance Rb, based on the battery voltage Vb detected by the voltage sensor 48 and the battery current Ib detected by the current sensor 49 (step S200). FIG. 5 illustrates one example of a process of obtaining the battery resistance Rb from the battery voltage Vb and the battery current Ib. The battery voltage Vb, the battery current Ib and the battery resistance Rb have a relationship of Expression (1) given below. As shown in FIG. 5, the battery resistance Rb may be determined as a slope of the battery voltage Vb relative to the battery current Ib in Expression (1), which is obtained by, for example, the least square method from multiple sets of the detected battery voltages Vb and battery currents Ib. In Expression (1), "OCV" represents an open voltage of the battery 40.

$$V=OCV-Rb\cdot Ib \qquad (1)$$

Figure 6:
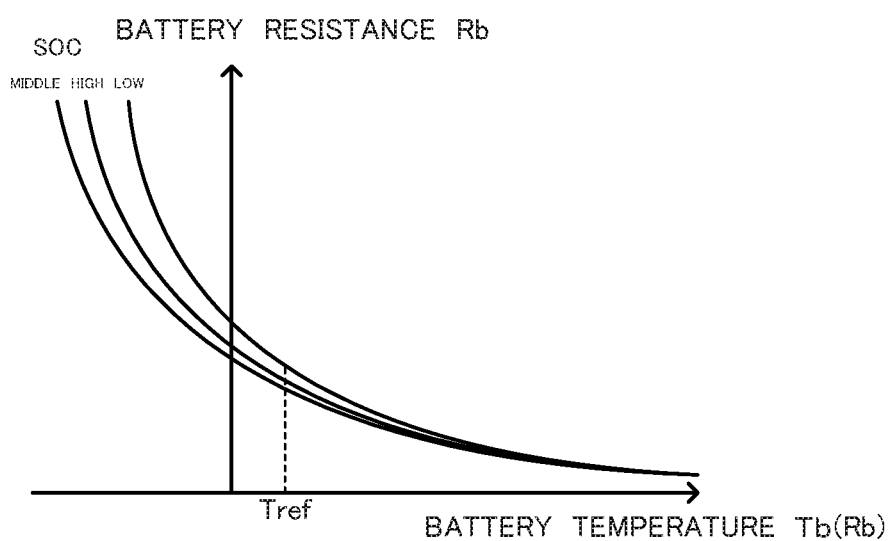
FIG. 6 is a diagram illustrating one example of a battery temperature setting map.

The electronic control unit 70 subsequently estimates a battery temperature Tb(Rb) that denotes an estimated temperature of the battery 40, based on the determined battery resistance Rb (step S210). A procedure of estimating the battery temperature Tb(Rb) may determine in advance a relationship between the battery resistance Rb and the battery temperature Tb(Rb) experimentally or otherwise, store the relationship in the form of a battery temperature setting map, and read a battery temperature Tb(Rb) corresponding to a given battery resistance Rb from the map. FIG. 6 illustrates one example of the battery temperature setting maps. As illustrated, different levels of the state of charge SOC of the battery 40 provide slightly different battery temperature setting maps. According to the embodiment, the battery temperature Tb(Rb) is determined, based on the state of charge SOC and the battery current Rb.

The electronic control unit 70 subsequently determines whether this time the routine is performed is the first time since the occurrence of an abnormality in the temperature sensor 46 (step S220). When it is determined that this time is the first time, the electronic control unit 70 sets the battery temperature Tb detected by the temperature sensor 46 before the occurrence of the abnormality, i.e., the last time in the normal state, to the reference temperature Tb(st) (step S230) and sets a value 1 to a reference temperature flag F (step S240). The reference temperature flag F is a flag that is set to the value 1 when the reference temperature Tb(st) is set by this routine and that is reset to a value 1 at the time of a system stop or at the time of a system restart.

The electronic control unit 70 subsequently determines whether the intake air temperature Ta from the temperature sensor 58 placed at the air inlet 52 of the cooling device 50 is higher than the reference temperature Tb(st) (step S290). When it is determined that the intake air temperature Ta is equal to or lower than the reference temperature Tb(st), the electronic control unit 70 terminates this routine. When it is determined that the intake air temperature Ta is higher than the reference temperature Tb(st), on the other hand, the electronic control unit 70 sets the intake air temperature Ta to the reference temperature Tb(st) (step S300) and terminates this routine. The intake air temperature Ta is expected to be generally not higher than the temperature of the battery 40. When the intake air temperature Ta is higher than the reference temperature Tb(st), setting the intake air temperature Ta to the reference temperature Tb(st) provides the more appropriate reference temperature Tb(st) and enables the drivable time to be set more appropriately.

As described above, when the routine is performed for the first time since the occurrence of an abnormality in the temperature sensor 46, the battery temperature Tb detected by the temperature sensor 46 immediately before the occurrence of the abnormality is basically set to the reference temperature Tb(st). When the intake air temperature Ta of the cooling device 50 is higher than the reference temperature Tb(st), the intake air temperature Ta is set to the reference temperature Tb(st). This configuration takes into account the external factor with regard to the temperature of the battery 40 and thereby enables the reference temperature Tb(st) of the battery 40 to be set more appropriately.

When it is determined at step S220 that this time the routine is performed is not the first time since the occurrence of an abnormality in the temperature sensor 46, on the other hand, the electronic control unit 70 determines whether the reference temperature flag F is equal to the value 0 or whether the battery temperature Tb(Rb) estimated from the battery resistance Rb is lower than a reference value Tref (step S250). The reference temperature flag F is equal to the value 0, for example, when the electronic control unit 70 restarts the system with elapse of a certain time period after setting the reference temperature Tb(st) to calculate the drivable time, performing the emergency drive, and stopping the vehicle to stop the system. This is because the reference temperature flag F is reset to the value 0 at the time of a system stop or at the time of a system restart as described above. The reference value Tref denotes a predetermined temperature that decreases the sensitivity of the battery temperature Tb(Rb) relative to a change in battery resistance Rb in the battery temperature setting map. Accordingly, the battery temperature Tb(Rb) estimated from the battery resistance Rb has the lower accuracy when the battery temperature Tb(Rb) is equal to or higher than the reference value Tref, compared with the accuracy when the battery temperature Tb(Rb) is lower than the reference value Tref.

When it is determined at step S250 that the battery temperature Tb(Rb) estimated from the battery resistance Rb is lower than the reference value Tref, the electronic control unit 70 sets the battery temperature Tb(Rb) estimated from the battery resistance Rb, to the reference temperature Tb(st) (step S260) and sets the value 1 to the reference temperature flag F when the reference temperature flag F is equal to the value 0 (steps S270 and S280). As described above, in the case where the reference temperature Tb(st) is set for the second time or the subsequent time since the occurrence of an abnormality in the temperature sensor 46, when the battery temperature Tb(Rb) estimated from the battery resistance Rb is lower than the reference value Tref, the battery temperature Tb(Rb) estimated from the battery resistance Rb is basically set to the reference temperature Tb(st). This configuration well responds to a subsequent change in the temperature of the battery 40 and excludes the case where the battery temperature Tb(Rb) estimated from the battery resistance Rb has low accuracy. This accordingly enables the reference temperature Tb(st) to be set more appropriately.

When it is determined at step S250 that the reference temperature flag F is equal to the value 0, the electronic control unit 70 sets the battery temperature Tb(Rb) estimated from the battery resistance Rb, to the reference temperature Tb(st) (step S260) and sets the value 1 to the reference temperature flag F when the reference temperature flag F is equal to the value 0 (steps S270 and S280). As described above, when the electronic control unit 70 restarts the system with elapse of a certain time period after setting the reference temperature Tb(st) to calculate the drivable time, performing the emergency drive, and stopping the vehicle to stop the system, the battery temperature Tb(Rb) estimated from the battery resistance Rb is basically set to the reference temperature Tb(st). This configuration enables the reference temperature Tb(st) to be set more appropriately and thereby enables the drivable time to be calculated more appropriately.

The electronic control unit 70 subsequently determines whether the intake air temperature Ta from the temperature sensor 58 is higher than the reference temperature Tb(st) (step S290). When it is determined that the intake air temperature Ta is equal to or lower than the reference temperature Tb(st), the electronic control unit 70 terminates this routine. When it is determined that the intake air temperature Ta is higher than the reference temperature Tb(st), on the other hand, the electronic control unit 70 sets the intake air temperature Ta to the reference temperature Tb(st) (step S300) and terminates this routine. This configuration takes into account the external factor with regard to the temperature of the battery 40 and thereby enables the reference temperature Tb(st) of the battery 40 to be set more appropriately.

When it is determined at step S250 that the reference temperature flag F is equal to the value 1 and that the battery temperature Tb(Rb) estimated from the battery resistance Rb is equal to or higher than the reference value Tref, on the other hand, the electronic control unit 70 proceeds to step S290 without newly setting the reference temperature Tb(st). In this case, the electronic control unit 70 determines whether the intake air temperature Ta from the temperature sensor 58 is higher than the previously set reference temperature Tb(st) (step S290). When it is determined that the intake air temperature Ta is equal to or lower than the reference temperature Tb(st), the electronic control unit 70 terminates this routine. When it is determined that the intake air temperature Ta is higher than the reference temperature Tb(st), on the other hand, the electronic control unit 70 sets the intake air temperature Ta to the reference temperature Tb(st) (step S300) and terminates this routine. This configuration responds to the case where the battery temperature Tb(Rb) estimated from the battery resistance Rb has low accuracy.

As described above, in the event of an abnormality occurring in the temperature sensor 46 that is used to detect the temperature of the battery 40, the electric vehicle 20 of the embodiment sets the reference temperature Tb(st) of the battery 40, determines the drivable time according to the reference temperature Tb(st), and performs the system stop when the driving time reaches the drivable time. This configuration assures the emergency drive, while suppressing damage of the battery 40 even in the event of an abnormality occurring in the temperature sensor 46. When the reference temperature Tb(st) is to be set for the first time since the occurrence of an abnormality in the temperature sensor 46, the battery temperature Tb detected by the temperature sensor 46 immediately before the occurrence of the abnormality is basically set to the reference temperature Tb(st). This configuration enables the reference temperature Tb(st) to be set more appropriately and thereby enables the drivable time to be set more appropriately. When the reference temperature Tb(st) is to be set for the second or subsequent time since the occurrence of an abnormality in the temperature sensor 46, the battery temperature Tb(Rb) estimated from the battery resistance Rb is basically set to the reference temperature Tb(st). This configuration well responds to a subsequent change in the temperature of the battery 40 and excludes the case where the battery temperature Tb(Rb) estimated from the battery resistance Rb has low accuracy. This accordingly enables the reference temperature Tb(st) to be set more appropriately. Furthermore, when the battery temperature Tb(Rb) estimated from the battery resistance Rb is lower than the reference value Tref, the battery temperature Tb(Rb) estimated from the battery resistance Rb is set to the reference temperature Tb(st). This configuration excludes the case where the battery temperature Tb(Rb) has low accuracy and enables the reference temperature Tb(st) to be set more appropriately. In both the case where the reference temperature Tb(st) is to be set for the first time since the occurrence of an abnormality in the temperature sensor 46 and the case where the reference temperature Tb(st) is to be set for the second or subsequent time, when the intake air temperature Ta of the cooling device 50 is higher than the reference temperature Tb(st), the intake air temperature Ta is set to the reference temperature Tb(st). This configuration takes into account the external factor with regard to the temperature of the battery 40 and thereby enables the reference temperature Tb(st) to be set more appropriately. As a result, this configuration more appropriately performs the emergency drive, while suppressing damage of the battery 40, even in the event of an abnormality occurring in the temperature sensor 46 that is used to detect the temperature of the battery 40.

When the electric vehicle 20 of the embodiment restarts the system with elapse of a certain time period after setting the reference temperature Tb(st) to calculate the drivable time, performing the emergency drive, and stopping the vehicle to stop the system, the battery temperature Tb(Rb) estimated from the battery resistance Rb is basically set to the reference temperature Tb(st). This configuration well responds to a subsequent change in the temperature of the battery 40 and enables the reference temperature Tb(st) to be set more appropriately. As a result, this enables the drivable time to be calculated more appropriately. Even in this case, when the intake air temperature Ta of the cooling device 50 is higher than the reference temperature Tb(st), the intake air temperature Ta is set to the reference temperature Tb(st). This configuration takes into account the external factor with regard to the temperature of the battery 40 and thereby enables the reference temperature Tb(st) to be set more appropriately.

In the electric vehicle 20 of the embodiment, when the reference temperature Tb(st) is to be set for the first time since the occurrence of an abnormality in the temperature sensor 46, the battery temperature Tb detected by the temperature sensor 46 immediately before the occurrence of the abnormality is set to the reference temperature Tb(st). Even in this case, when the intake air temperature Ta of the cooling device 50 is higher than the reference temperature Tb(st), the intake air temperature Ta is set to the reference temperature Tb(st). According to a modification, however, when the reference temperature Tb(st) is to be set for the first time since the occurrence of an abnormality in the temperature sensor 46, the battery temperature Tb detected by the temperature sensor 46 immediately before the occurrence of the abnormality may be set to the reference temperature Tb(st), irrespective of the intake air temperature Ta of the cooling device 50.

In the electric vehicle 20 of the embodiment, when the reference temperature Tb(st) is to be set for the second or subsequent time since the occurrence of an abnormality in the temperature sensor 46, the battery temperature Tb(Rb) estimated from the battery resistance Rb is set to the reference temperature Tb(st). Even in this case, when the intake air temperature Ta of the cooling device 50 is higher than the reference temperature Tb(st), the intake air temperature Ta is set to the reference temperature Tb(st). According to a modification, however, when the reference temperature Tb(st) is to be set for the second or subsequent time since the occurrence of an abnormality in the temperature sensor 46, the battery temperature Tb(Rb) estimated from the battery resistance Rb may be set to the reference temperature Tb(st), irrespective of the intake air temperature Ta of the cooling device 50.

In the electric vehicle 20 of the embodiment, when the reference temperature Tb(st) is to be set for the second or subsequent time since the occurrence of an abnormality in the temperature sensor 46, the battery temperature Tb(Rb) estimated from the battery resistance Rb is set to the reference temperature Tb(st), in the case where the battery temperature Tb(Rb) estimated from the battery resistance Rb is lower than the reference value Tref. According to a modification, however, the battery temperature Tb(Rb) estimated from the battery resistance Rb may be set to the reference temperature Tb(st), whether the battery temperature Tb(Rb) is lower than the reference value Tref or not.

The electric vehicle 20 of the embodiment is provided with the single motor 32 as the motor configured to output the power for driving. According to a modification, the electric vehicle may be provided with a plurality of motors for driving.

In the electrically driven vehicle of the above aspect, the control device may include a cooling device configured to cool down the battery using outside air, when temperature of intake air of the cooling device is higher than the reference temperature, the cooling device may use the temperature of the intake air, as the reference temperature. The temperature of the intake air of the cooling device is expected to be equal to or lower than the temperature of the battery. When the temperature of the intake air of the cooling device is higher than the reference temperature, the temperature of the intake air is set to the reference temperature. This configuration enables the drivable time to be set by using the more appropriate reference temperature.

In the electrically driven vehicle of the above aspect, even when the reference temperature is used for the second or subsequent time since the occurrence of the abnormality in the temperature sensor, the control device may use a previously used reference temperature, as the reference temperature in a case where the temperature obtained by applying the resistance value to the correlation is equal to or higher than a threshold value. This is based on such a correlation between the battery resistance and the battery temperature that the sensitivity of a change in the resistance relative to the temperature decreases in a high temperature range to reduce the accuracy.

The following describes the correspondence relationship between the primary elements of the above embodiment and the primary elements of the disclosure described in Summary. The battery 50 of the embodiment corresponds to the "battery", the temperature sensor 46 corresponds to the "temperature sensor", the motor 32 corresponds to the "motor", and the electronic control unit 70 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The aspects of the present disclosure are applicable to, for example, manufacturing industries of electrically driven vehicles.

The invention claimed is:

1. An electrically driven vehicle, comprising:
a battery;
a temperature sensor configured to detect a temperature of the battery;
a motor configured to output a power for driving by using electric power from the battery; and
a control device configured to set a drivable time using a map where a relationship between a reference temperature of the battery and the drivable time is predetermined, when an abnormality occurs in the temperature sensor, wherein
the control device is configured to:
(1) when the reference temperature is used for a first time since the occurrence of the abnormality in the temperature sensor, use a temperature detected before the occurrence of the abnormality in the temperature sensor, as the reference temperature; and
(2) when the reference temperature is used for a second or subsequent time since the occurrence of the abnormality in the temperature sensor, use a temperature obtained by applying a resistance value based on an inter-terminal voltage of the battery and an electric current flowing in the battery, to a correlation between battery resistance and battery temperature, as the reference temperature.

2. The electrically driven vehicle according to claim 1, wherein when the reference temperature is used for the second or subsequent time since the occurrence of the abnormality in the temperature sensor, the control device uses the reference temperature used for the first time since the occurrence of the abnormality in the temperature sensor or a previously used reference temperature, as the reference temperature in a case where the temperature obtained by applying the resistance value to the correlation is equal to or higher than a threshold value.

3. The electrically driven vehicle according to claim 1, wherein when the electrically driven vehicle restarts a system after determining that the abnormality occurred in the temperature sensor and performing a system stop, the control device uses the temperature obtained by applying the resistance value to the correlation, as the reference temperature.

4. The electrically driven vehicle according to claim 1, further comprising:
a cooling device configured to cool down the battery using outside air, wherein
when temperature of intake air of the cooling device is higher than the reference temperature used for the first time, second time, or subsequent time since the occurrence of the abnormality in the temperature sensor, the cooling device uses the temperature of the intake air, as the reference temperature.

5. The electrically driven vehicle according to claim 4, wherein when the reference temperature is used for the second or subsequent time since the occurrence of the abnormality in the temperature sensor, the control device uses the reference temperature used for the first time since the occurrence of the abnormality in the temperature sensor or a previously used reference temperature, as the reference temperature in a case where the temperature obtained by applying the resistance value to the correlation is equal to or higher than a threshold value.

6. The electrically driven vehicle according to claim 4, wherein when the electrically driven vehicle restarts a system after performing an emergency drive in the event of the abnormality occurring in the temperature sensor and performing a system stop, the control device uses the temperature obtained by applying the resistance value to the correlation, as the reference temperature.

7. The electrically driven vehicle according to claim 2, wherein when the electrically driven vehicle restarts a system after performing an emergency drive in the event of the abnormality occurring in the temperature sensor and performing a system stop, the control device uses the temperature obtained by applying the resistance value to the correlation, as the reference temperature.

* * * * *